(12) United States Patent
Kolb

(10) Patent No.: US 6,178,531 B1
(45) Date of Patent: Jan. 23, 2001

(54) METHOD AND APPARATUS FOR REMOTELY TESTING TOKEN RING LOCAL AREA NETWORKS

(75) Inventor: Ronald E. Kolb, Lexington, SC (US)

(73) Assignee: NCR Corporation, Dayton, OH (US)

( * ) Notice: Under 35 U.S.C. 154(b), the term of this patent shall be extended for 0 days.

(21) Appl. No.: 09/216,340

(22) Filed: Dec. 18, 1998

(51) Int. Cl.⁷ ...................................... G06F 11/00
(52) U.S. Cl. .................. 714/715; 714/712; 370/253; 709/224
(58) Field of Search .................... 714/715, 712; 709/224; 370/253; 364/514 B

(56) References Cited

U.S. PATENT DOCUMENTS

| | | | |
|---|---|---|---|
| 5,365,513 | * 11/1994 | Copley et al. | 370/253 |
| 5,381,348 | * 1/1995 | Ernst et al. | 364/514 B |
| 5,390,188 | 2/1995 | Dawson | 371/20.6 |
| 5,446,726 | 8/1995 | Rostoker et al. | 370/17 |
| 5,568,471 | 10/1996 | Hershey et al. | 370/17 |
| 5,577,249 | 11/1996 | Califano | 395/611 |
| 5,590,345 | 12/1996 | Barker et al. | 395/800 |
| 5,604,867 | 2/1997 | Harwood | 395/200.13 |
| 5,634,015 | 5/1997 | Chang et al. | 395/309 |
| 5,640,399 | 6/1997 | Rostoker et al. | 370/392 |
| 5,655,140 | 8/1997 | Haddock | 395/200.76 |
| 5,668,800 | 9/1997 | Stevenson | 370/248 |
| 5,708,836 | 1/1998 | Wilkinson et al. | 395/800 |

\* cited by examiner

Primary Examiner—Phung M. Chung
(74) Attorney, Agent, or Firm—James M. Stover

(57) ABSTRACT

A method for remotely testing transmission line conditions in a token ring network. The method includes the steps of (1) generating at a remote station a series of test patterns simulating different frequency signals; (2) writing each test pattern into a token ring packet frame; (3) successively transmitting said test patterns from the remote station through a router connected to said token ring network to a receiving station on said token ring network; (4) measuring the time required for each transmitted test pattern to be successfully transmitted from the sending station to the receiving station; (5) comparing the transmission times measured for all successful test pattern transmissions; and (6) determining that a marginal transmission line condition exists within the token ring network when the transmission time associated with one of the test patterns greatly exceeds the transmission times associated with the other test patterns. The generated test patterns each comprise a differential Manchester encoded signal including a series of "one" and "zero" data values, modified so that signal state transitions corresponding to zero data values are delayed to occur at the very end of the first half of the bit period associated with the zero data value. These patterns include the following sequences: 1111111111111111 . . . ; 1010101010101010 . . . ; 1001001001001001 . . . ; 1000100010001000 . . . ; 1000010000100001 . . . ; 1000001000001000 . . . ; 1000000100000010 . . . ; 1000000010000000 . . . ; etc.

6 Claims, 7 Drawing Sheets

METHOD AND APPARATUS FOR REMOTELY TESTING TOKEN RING LOCAL AREA NETWORKS

RELATED APPLICATIONS

The present application is related to United States Patent Application titled "METHOD AND APPARATUS FOR DETECTING UNSTABLE TOKEN RING LOCAL AREA NETWORKS" by Ronald E. Kolb and assigned to NCR Corporation. This related application, identified by NCR Corporation Ser. No. 09/213,352, is filed concurrently with the present patent application.

FIELD OF THE INVENTION

The present invention relates generally local area networks (LANs) and more particularly to a method and an apparatus for remotely testing local area networks.

BACKGROUND OF THE INVENTION

A local area network (LAN) refers to a group of networked computers or nodes, such as personal computers or workstations, connected by a communications link that enables the network nodes to share information and resources within a relatively limited area. A token ring network is a local area network formed in a ring or closed loop topology that uses token passing to communicate between nodes on the network.

An exemplary token ring, local area network is illustrated in FIG. 1. The network 100 includes five network nodes, referenced individually as 101, 102, 103, 104, and 105. These five network nodes are coupled through respective coupling units, referenced individually as 111, 112, 113, 114, and 115 to a ring bus 120. Although five nodes are shown in FIG. 1, network 100 can contain many more than the five nodes shown.

To orderly manage accesses to bus 120, a token frame, or simply a token, is passed around ring bus 120 from one network node to another. The process for transmitting information from a first, or sending, network node to a second, or receiving, node along the ring bus is accomplished as follows. The sending node waits for a token, seizes the token, marks it as being in use, inserts the information to be transmitted into a message frame appended to the token, and releases the token to the ring bus for transmission to the next node. The token may only be held by one node at any one time. The message frame includes the address of the receiving network node to which the message is directed. The message frame is passed from node to node along the ring to the receiving node and continues until it is eventually transmitted back to the sending network node. While the message frame is being passed around, the intended receiving network node retains a copy of the message frame and indicates that it has done so by setting a predetermined field called a frame-copied field in the message frame. If the message frame is not successfully copied, as indicated by the state of the frame-copied field, the sending network node will re-send the token and message frame.

Each of the five network nodes shown in FIG. 1 includes a network interface including a medium access control (MAC) unit, an elastic buffer, and protocol control software. The MAC unit is responsible for performing frame encapsulation and de-encapsulation. In many encoding schemes, such as the commonly used Manchester encoding scheme, a reference clock is encoded into the binary data bit stream prior to transmission. The encoded data stream generated in accordance with the Manchester encoding scheme has a transition (positive or negative) in the middle of each bit cell period with the effect that the reference clock is readily extracted from the received encoded bit stream. The elastic buffer is responsible for synchronizing the reference clock with the bit cells in the data stream.

The protocol control software includes a monitor program. Among the five network nodes shown in FIG. 1, the monitor program is only in an active state in one node at any given time. The network node having the active monitor is referred to as an active network node, while the remaining network nodes are referred to as participating network nodes. The active monitor provides a reference clock to which all participating network nodes are synchronized for encoding or decoding the Manchester encoded signals.

While a token and included data is being passed from node to node along the ring bus, it can be distorted and data lost as a result of impedance mismatching of the transmission wires that form the ring bus. Such distortion can cause errors in phase alignments between bit cells and the reference clock, which in turn can result in encoding and decoding errors of the data stream. To recover the data stream, an elastic buffer within the active network node must realign the incoming signal with the reference clock. The active monitor in the active network node provides the realigned signal to all other participating network nodes. However, if the distortion is too great to be corrected, the active monitor will transmit a MAC error frame to denote the problem.

In the token ring environment, a LAN network is in a marginal condition when it can operate smoothly in idle or light traffic situation, but exhibits severe performance problem when the network is stressed with heavy traffic. Frequently, the marginal condition is not problematic until physical length is added to the LAN, i.e., additional length of transmission line is added to the network ring bus. Each component on a transmission line (wire, connectors, filters, multistation access units, etc.) has the potential to introduce an impedance mismatch that can result in a phase distortion. As components are added to the network, tolerances are approached or exceeded, resulting in transmission problems.

Because the symptoms of a marginal LAN network appear to be random, it is difficult to locate the root cause of the problem. Conventionally, a token ring network has to be shut down to locate the problem causing the marginal condition.

Therefore, there exists a need for a method to efficiently identify problems causing marginal condition in a token ring network, desirably from a remote location, and without requiring that the token ring network be shut down to identify the problem affecting the performance of the network.

OBJECTS OF THE INVENTION

It is therefore an object of the present invention to provide a new and useful method to remotely identify problems causing marginal conditions in a token ring network It is another object of the present invention to provide such a method for identifying network problems which does not require that the token ring network be shut down to identify network problems.

It is yet another object of the present invention to provide a new and useful method and apparatus for detecting marginal transmission conditions within a token ring network, by introducing test patterns representing different frequency patterns into the network from a remote location, and measuring the time period for the test patterns to traverse the network ring.

SUMMARY OF THE INVENTION

There is provided, in accordance with the present invention, a method for remotely testing the transmission line conditions in a token ring network. The method includes the steps of (1) generating at a remote station a series of test patterns simulating different frequency signals; (2) writing each test pattern into a token ring packet frame; (3) successively transmitting said test patterns from the remote station through a router connected to said token ring network to a receiving station on said token ring network; (4) measuring the time required for each transmitted test pattern to be successfully transmitted from the remote station to the receiving station; (5) comparing the transmission times measured for all successful test pattern transmissions; and (6) determining that a marginal transmission line condition exists within the token ring network when the transmission time associated with one of the test patterns greatly exceeds the transmission times associated with the other test patterns.

In the described embodiment, the test patterns each comprise a differential Manchester encoded signal including a series of "one" and "zero" data values. These patterns include a first test pattern comprising a sequence of all one data values; a second test pattern comprising a sequence of alternating one data values and zero data values; and third, fourth and additional test patterns comprising a sequence of one data values separated by two, three, and more zero data values, respectively. To improve the frequency simulations, the differential Manchester encoded signals are modified so that a signal state transition corresponding to a zero data value is delayed to occur at the very end of the first half of the bit period associated with the zero data value.

The above and other objects, features, and advantages of the present invention will become apparent from the following description and the attached drawings.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENT

The description of the invention which follows is presented to enable any person skilled in the art to make and use the invention, and is provided in the context of a particular application and its requirements. Various modifications to the preferred embodiment will be readily apparent to those skilled in the art, and the principles defined herein may be applied to other embodiments and applications without departing from the spirit and scope of the invention. Thus, the present invention is not intended to be limited to the embodiment shown, but is to be accorded with the broadest scope consistent with the principles and features disclosed herein.

Figure 2:
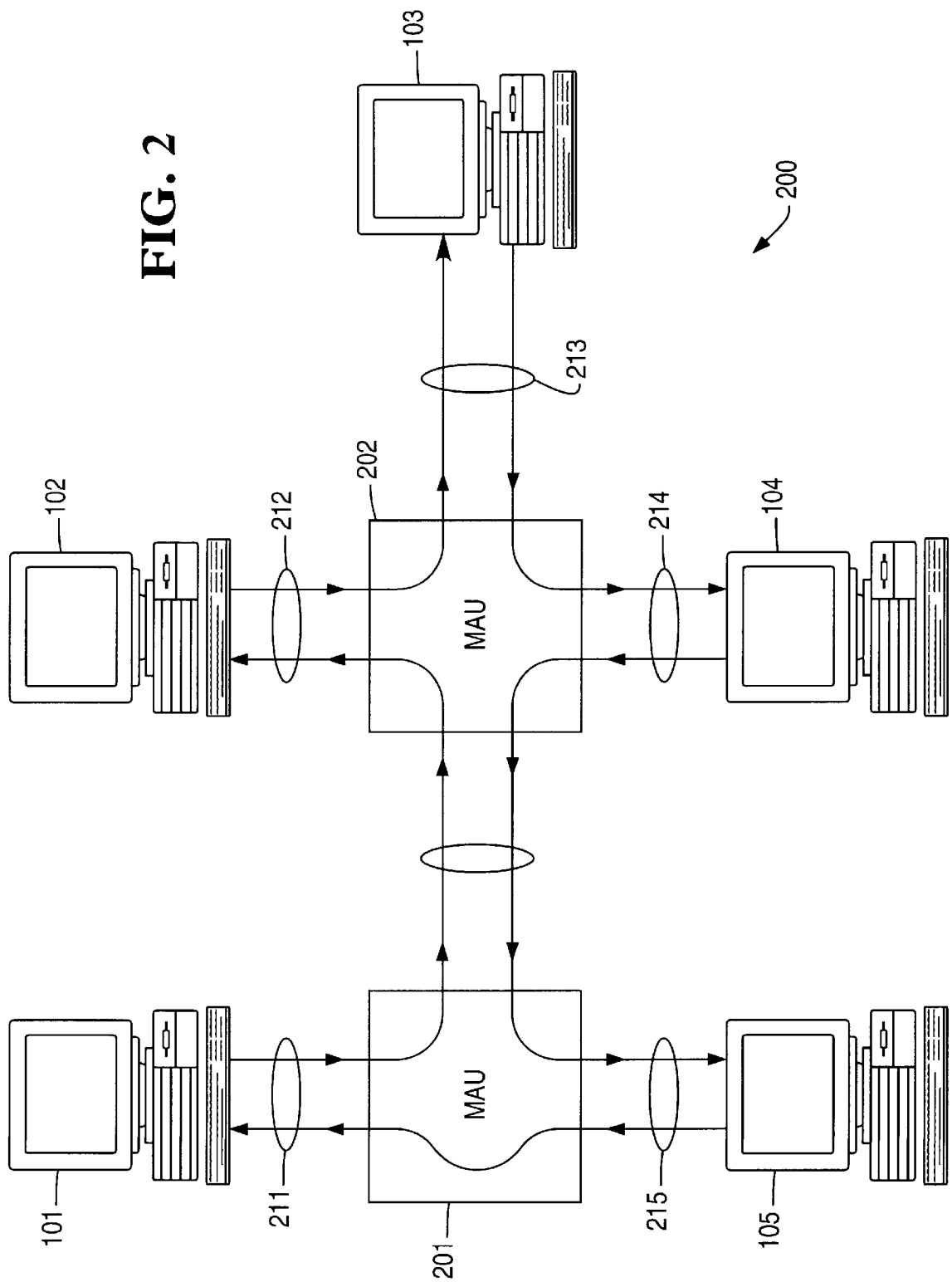
FIG. 2 shows an exemplary configuration of a token ring network including two multistation access units (MAUs) or wiring concentrators for physically connecting network nodes to form a ring topology.

A multistation access unit (MAU) is a wiring concentrator for physically connecting network nodes to form a ring topology. FIG. 2 shows an exemplary configuration of a token ring network 200 including two MAUs referenced individually 201 and 202. Connected to the two MAUs are five sets of wires referenced individually 211, 212, 213, 214, and 215. Through their respective sets of wires, the five network nodes 101, 102, 103, 104 and 105 are connected to the two MAUs to form a ring topology.

Figure 1:
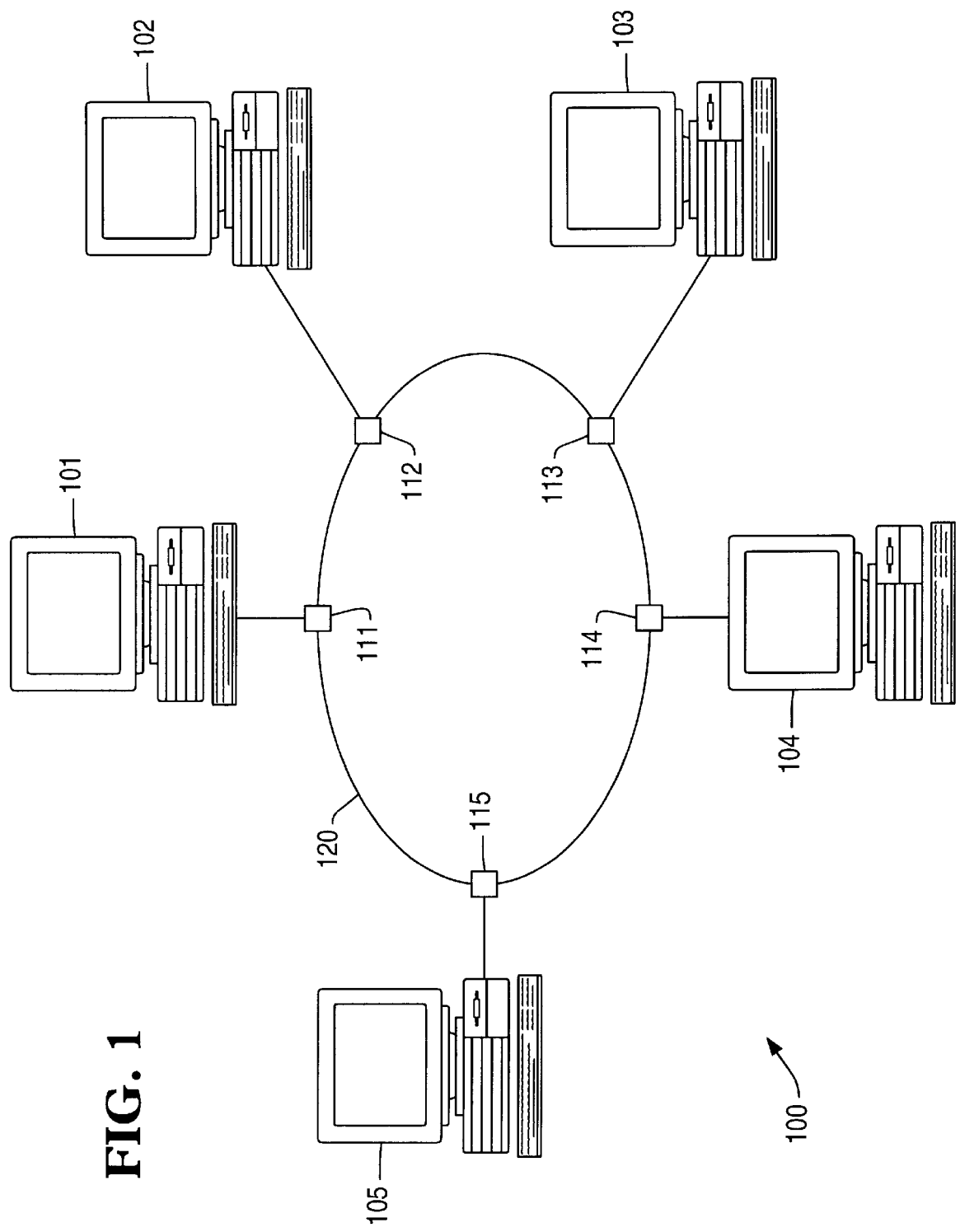
FIG. 1 is an illustration of an exemplary token ring, local area network.

As described earlier, each of the five network nodes shown in FIGS. 1 and 2 includes a network interface including: a medium access control (MAC) unit, an elastic buffer, and protocol control software. The MAC unit is responsible for performing frame encapsulation and de-encapsulation in compliance with the differential Manchester encoding scheme. The elastic buffer is responsible for synchronizing the reference clock with the bit cells in the data stream. The protocol control software includes a monitor program, active in only one network node at any given time, that provides a reference clock to which all participating network nodes are synchronized for encoding or decoding a differential Manchester signal.

The differential Manchester encoding scheme combines both data and timing signals into a single stream of bits for transmission along the ring bus. The data value for each bit in the encoded signal stream is indicated by the occurrence or non-occurrence of signal state transition during the first half of the bit period. A state transition also occurs at the middle of each bit period, from which the timing signal is determined.

Figure 3:
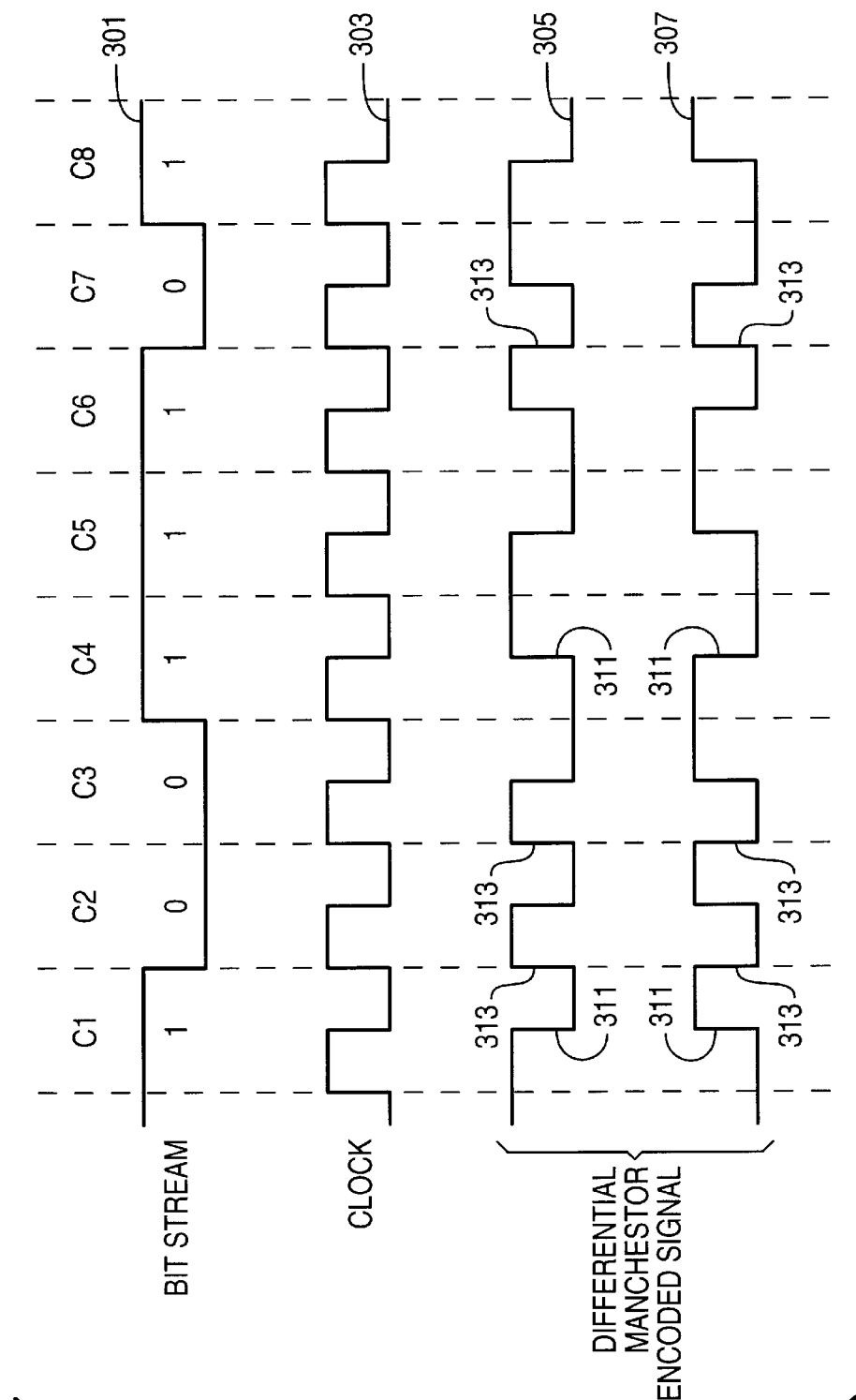
FIG. 3 is an illustration of the differential Manchester encoding scheme used for packet transmission in many token ring networks.

FIG. 3 provides an illustration of the differential Manchester encoding scheme used for packet transmission in many token ring networks. FIG. 3 shows four waveforms representing an exemplary bit stream signal to be encoded for transmission 301, a clock or timing signal 303, and two possible forms for the encoded signal 305 and 307. These signal waveforms are illustrated through eight bit periods C through C8. The binary representation of the bit stream to be encoded in the example of FIG. 3 is 10011101.

According to the differential Manchester encoding scheme, the reference clock 303 is encoded into a binary data bit stream prior to transmission. The resulted encoded data stream 305 or 307 has a transition 311, which can be either low state to high state (positive) or high state to low state (negative) in the middle of each bit cell period. The reference clock can thereby be readily extracted from the received encoded bit stream. This transition will be referred to herein as a clock related transition.

A transition 313, either positive or negative, occurring at the beginning of a bit period, such as in bit periods C2, C3, and C7 of waveforms 305 and 307, indicates a low or "zero" data value for the bit period. This transition will be referred to herein as a data affiliated transition. A steady state throughout the first half of the bit period, whether the state is low or high, as shown in bit periods C1, C4, C5, C6 and C8 of waveforms 305 and 307, indicates a high or "one" data value for the bit period. Thus, both waveform 305 and its inverse waveform 307, are decoded to reproduce the same data stream. Additional information on the Differential Manchester Encoded Signal can be found in the IEEE 802.5 Specifications for Token Ring.

Viewing the physical ring bus as a transmission line, it is possible to introduce a frequency pattern into a network that will produce reflections in a marginal section of the transmission line. As the introduced frequency pattern approaches resonance in a section of transmission line, the reflected frequency pattern should be close to 180° out of phase with the introduced pattern causing signal cancellation and phase distortion, and requiring the retransmission of MAC frames.

A range of frequencies can be simulated by different generated bit stream patterns, each filling a single token ring frame, that is then transmitted around the ring bus. In a stable token ring network, each frame and its contained frequency pattern, should traverse the ring bus in the same amount of time. However, in a marginal network, a frame containing a frequency pattern that produces reflections and resonance severe enough to result in retransmission of the frame will require an extended period of time for a successful transmission of the frame. Thus, by generating a series of bit stream patterns representing different frequencies, transmitting the bit patterns in same-size frames through the ring bus, and monitoring the time for each successful transmission, the condition of the ring bus can be ascertained.

Figure 4:
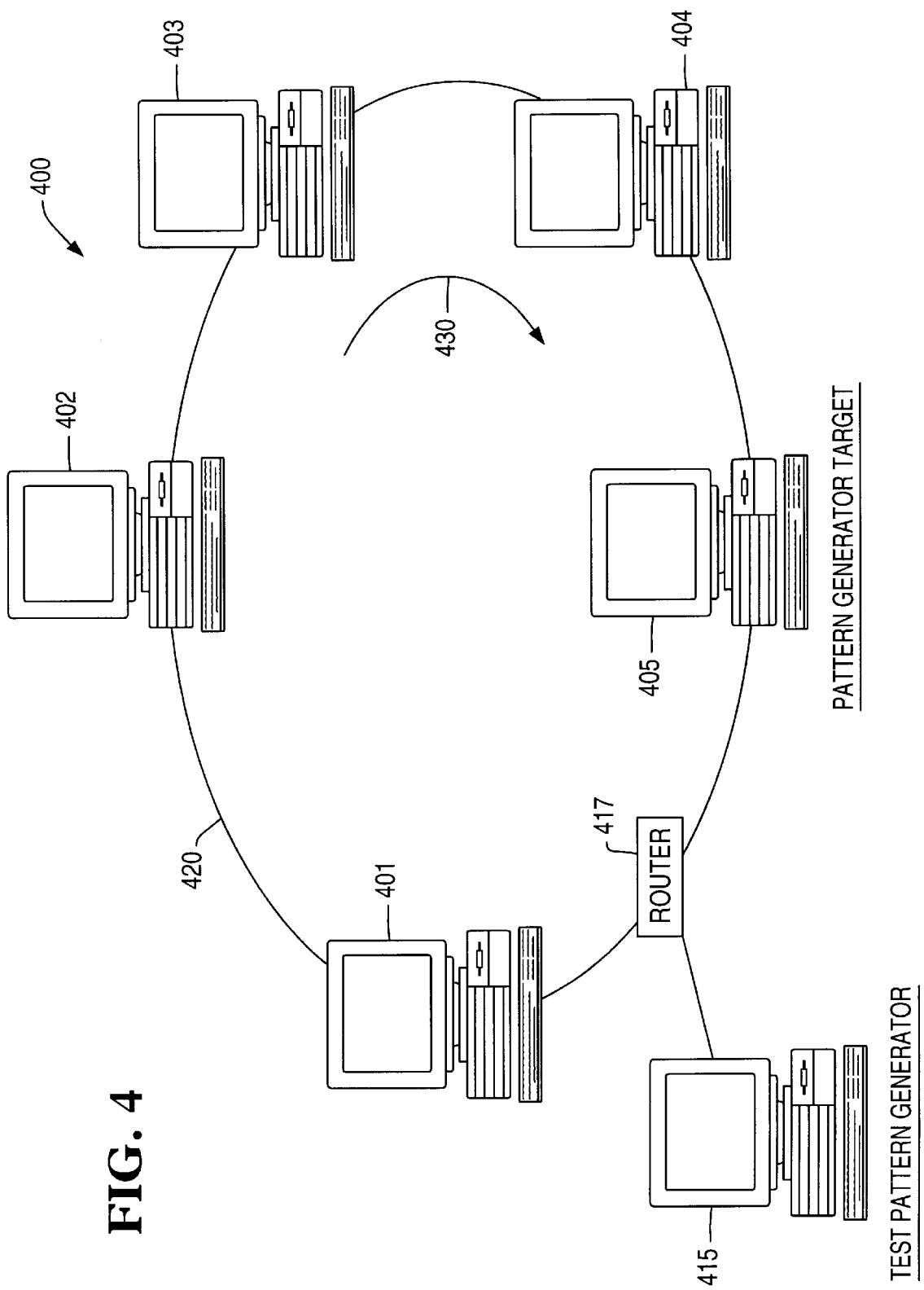
FIG. 4 is an illustration of a token ring local area network including a remote pattern generator and router for identifying marginal network conditions in accordance with the present invention.

Referring to FIG. 4, there is shown a token ring network 400, and a remote station 415 connected to network 400 through a router 417. Remote station 415 contains a pattern generator program for generating pattern frames with a fixed length but containing different patterns of 1s and 0s. These patterns begin with a sequence of all "ones" and continue with patterns including "ones" separated by one, two, three, etc. "zeros" as shown below:

1. 1111111111111111 . . .
2. 1010101010101010 . . .
3. 100100100100100 . . .
4. 1000100010001000 . . .
5. 10000100001000100 . . .
6. 1000001000001000000 . . .
7. 1000000100000001000 . . .
8. 100000001000000010 . . .
●
●
●

In the earlier discussion of differential Manchester encoded signals, it was explained that a data value for each bit in the encoded signal stream is indicated by the occurrence or non-occurrence of a signal state transition during the first half of a bit period. A transition, either positive or negative, occurring at the beginning of a bit period indicates a low or "zero" data value for the bit period, while a steady state throughout the first half of the bit period indicates a high or "one" data value for the bit period. Typically the transition associated with a zero data value occurs at the very beginning of the bit period, as illustrated in the signal waveforms 305 and 307 of FIG. 3. However, to simulate the different frequencies used to test the condition of the token ring, the point at which the transitions associated with zero data values occurs in the patterns produced by the pattern generator program have been altered. In the generated patterns, each transition associated with a zero data value is delayed to occur at the very end of the first half of the bit period associated with the zero data value, while still complying with the requirements of IEEE 802.5 Specifications for Token Ring.

Figure 5:
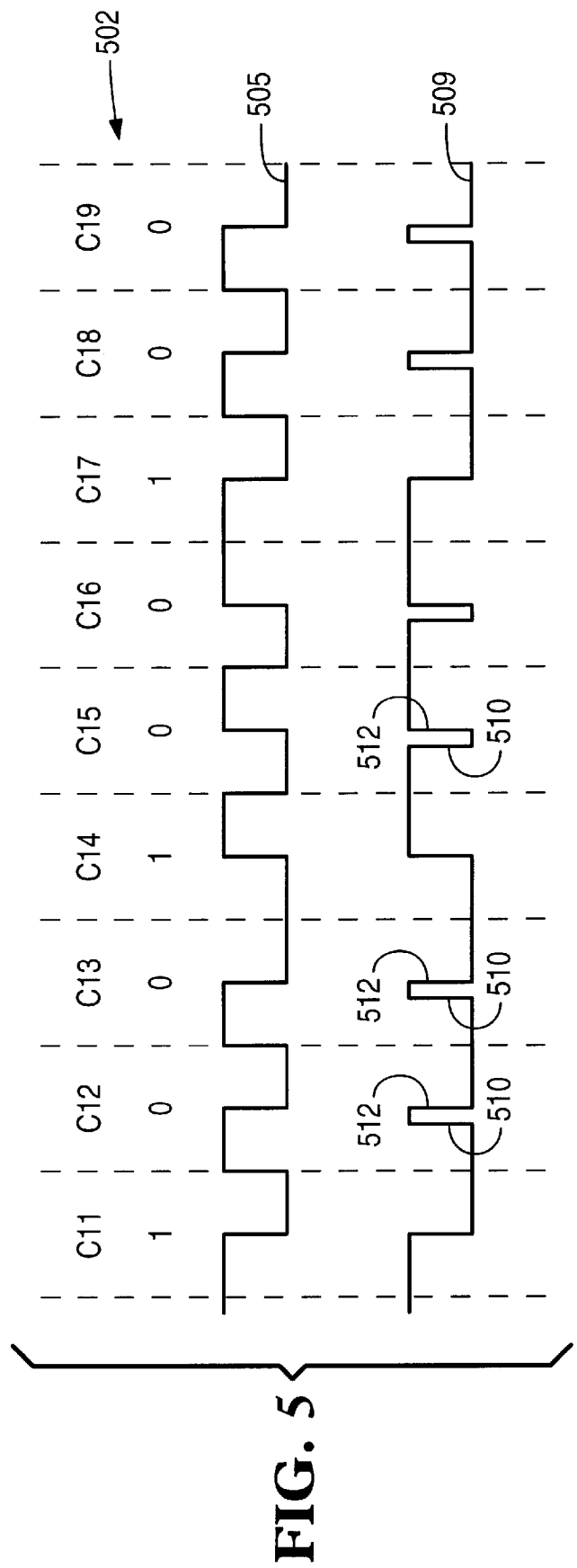
FIG. 5 is an illustration of a modified differential Manchester encoding scheme used within the test patterns generated in accordance with the present invention.

An example of one of the generated patterns is provided in FIG. 5. Waveform 505 is a standard or typical differential Manchester encoded signal associated with the bit pattern 502, comprising the sequence 100100100 . . . As can be seen in waveform 505, the data affiliated transitions associated with each zero data value transmitted during bit periods C12, C13, C15, C16, C18 an C19, occur at the beginning of the respective bit periods. The state change which results following each data affiliated transition 506 remains for one-half of a bit period, at which time a clock related transition 508 occurs. However, as can be seen in waveform 509, the data affiliated transitions 510 associated with each zero data value transmitted during bit periods C12, C13, C15, C16, C18 an C19, occur near the center of the respective bit periods, just prior to the clock related transitions 512. The state change that results following each data affiliated transition in waveform 509 is of minimum duration.

Figure 6:
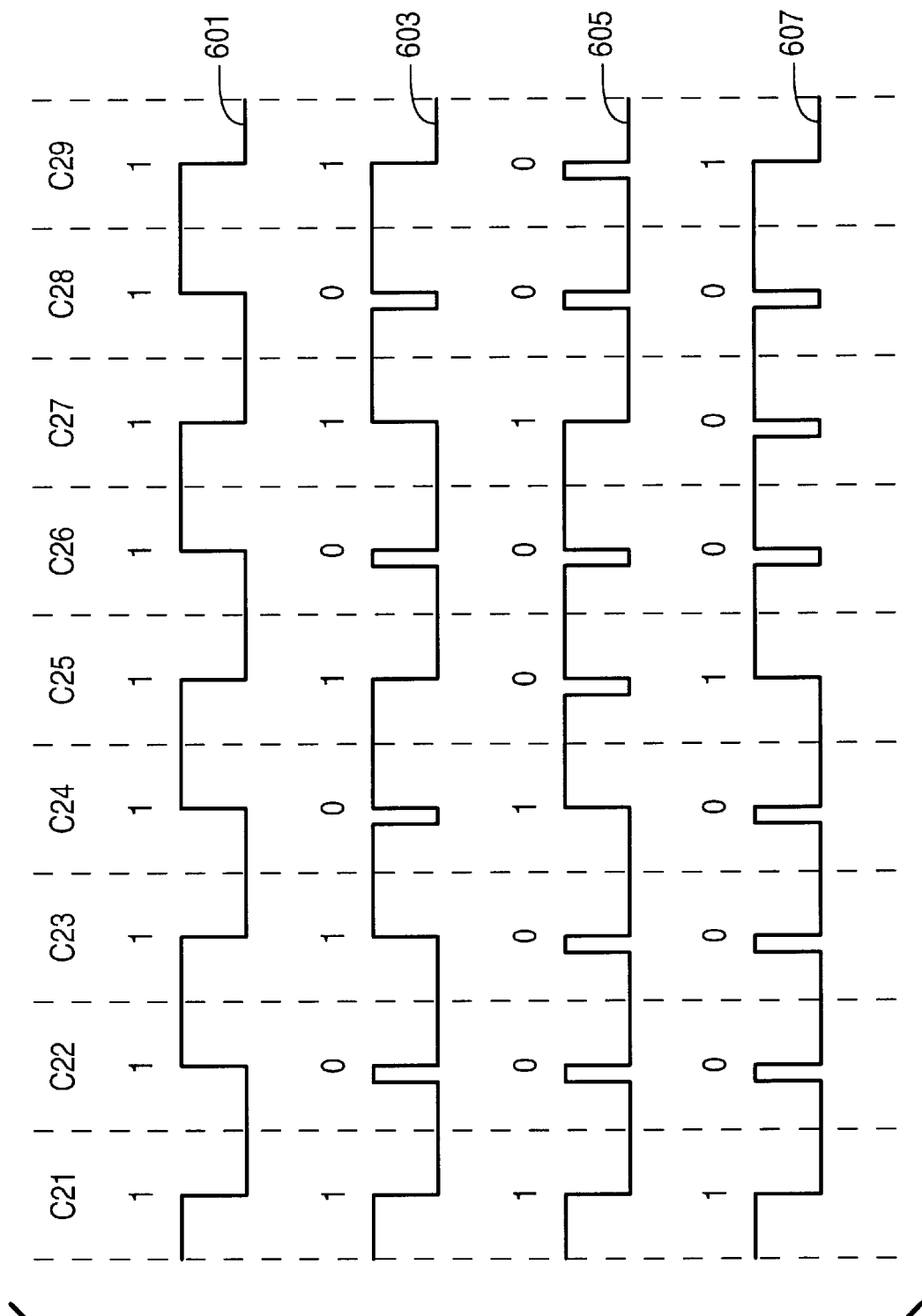
FIG. 6 is an illustration of some of the test pattern waveforms generated to test a token ring network in accordance with the present invention.

FIG. 6 provides illustrations of four generated test pattern waveforms 601, 603, 605 and 607 for bit sequences 111111111 . . . , 101010101 . . . , 100100100 . . . , and 100010001 . . . , respectively. Waveform 601 for the bit sequence 111111111 . . . is seen to have a cycle length equivalent to two bit periods and a frequency which is ½ the encoded clock frequency. Ignoring the minimum state periods generated by each zero data value transmission, the three waveforms 603, 605 and 607 have major frequencies of ¼, ⅙ and ⅛ of the encoded clock frequency, respectively, and cycle lengths of 4, 6 and 8 bit periods, respectively.

Each pattern of 1s and 0s described immediately above is written into a token ring frame up to 4096 bits in size, and in turn sent from remote station 415 to a target network node 405, each producing a different frequency signal on the token ring. Target node 405 is shown to be the node furthest from sending node 415 along the path shown by arrow 430.

In a marginal network one of these frequency patterns may produces reflections and resonance severe enough to result in retransmission of the frame. Router 419 includes software for collecting transmission time information and possibly other error information for each test pattern transmission. By monitoring the amount of time each frame requires for a successful transmission from sending station 415 to target network node 405 a frequency may be identified which requires an extended period of time for successful transmission, indicating the network is in a marginal condition. If all frequency patterns transmit successfully in the same amount of time, the token ring network is not in a marginal condition. Should one of more frequency patterns require significantly more time to successfully transmit, the token ring network is in a marginal condition.

Figure 7:
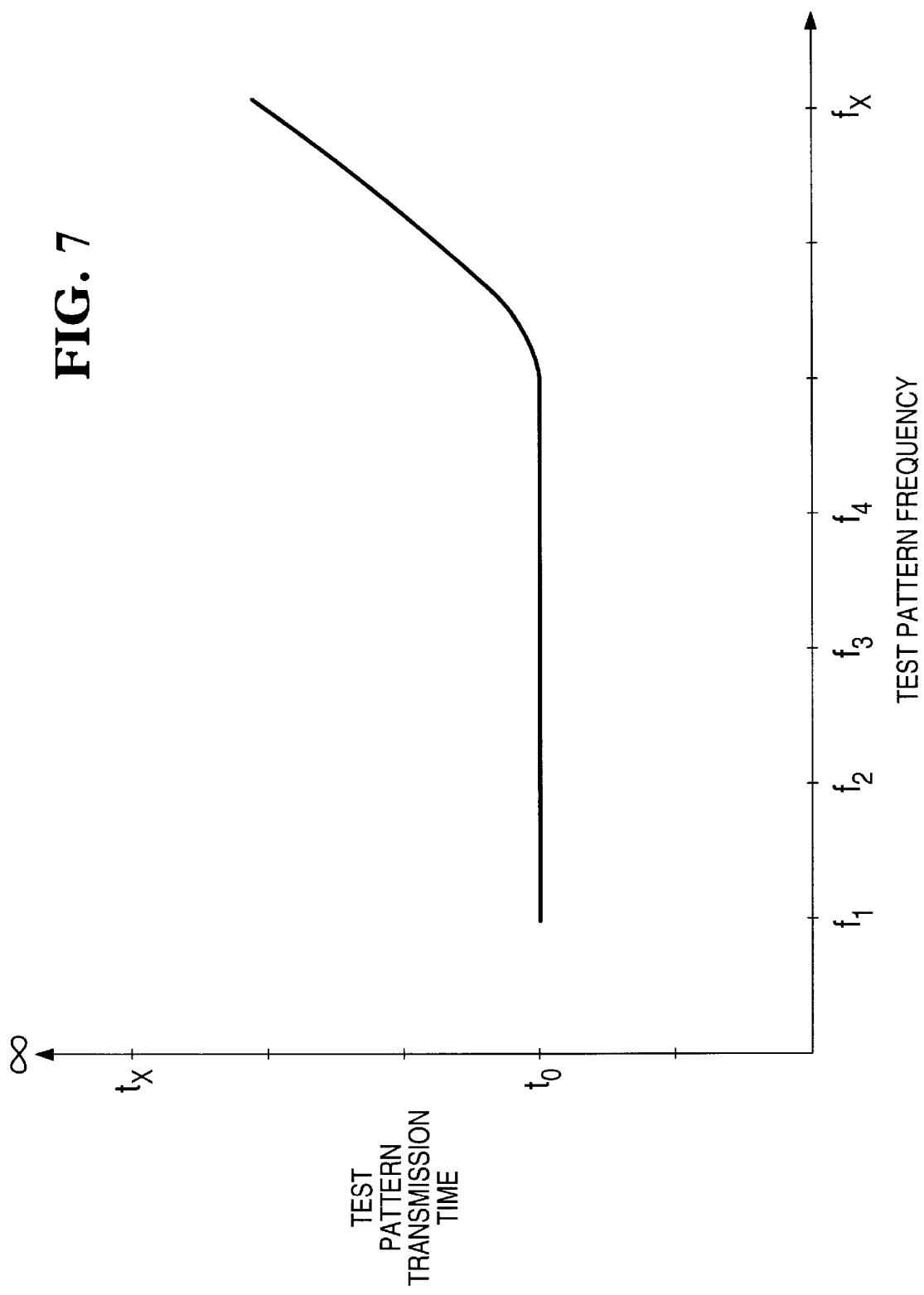
FIG. 7 is a graph illustrating the relationship between test pattern frequency and test pattern transmission time in a marginal token ring network, tested in accordance with the present invention.

FIG. 7 is a graph illustrating the relationship between test pattern frequencies and pattern transmission time in a marginal token ring network, tested in accordance with the system described above. The frequencies associated with the several test patterns are identified along the x-axis of the graph by the labels $f_1$, $f_2$, $f_3$, $f_4$, . . . $f_X$. The frame transmission time for each test pattern is plotted along the y-axis. Most test pattern frames are shown as transmitting successfully in a time of $t_0$. However, the test pattern identified by frequency $f_X$ is seen to require a much greater time $t_X$ for transmission, indicating a transmission problem in the network.

It can thus be seen that there has been provided by the present invention a new and useful method and apparatus for detecting marginal transmission conditions within a token ring network, by introducing test patterns representing different frequency patterns into the network from a remote location, and measuring the time period for the test patterns to traverse the network ring.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. Apparatus for remotely testing transmission line conditions in a token ring network, comprising:
   a remote station connected through a router to said token ring network, said remote station including a pattern generator for:
      generating a series of test patterns simulating different frequency signals;
      writing each test pattern into a token ring packet frame; and
      successively transmitting said test patterns from said remote station through a router to said token ring network; and
   a receiving station connected to said token ring network, said receiving station including means for:
      receiving said test patterns from said remote station;
      transmitting a request to said remote station to re-transmit a test pattern containing uncorrectable errors; and
      monitoring the time required to complete a successful transmission of each test pattern.

2. The apparatus according to claim 1,
   said test patterns each comprise a differential Manchester encoded signal including a series of "one" and "zero" data values; and
   said test patterns include:
      a first test pattern comprising a sequence of all one data values;
      a second test pattern comprising a sequence of alternating one data values and zero data values; and
      third, fourth and additional test patterns comprising a sequence of one data values separated by two, three, and more zero data values, respectively.

3. The apparatus according to claim 2,
   said differential Manchester encoded signals include a series of bit periods wherein a signal state transition occurring within the first half of a bit period corresponds to a zero data value and a steady signal state throughout the first half of a bit period corresponds to a one data value;
   said differential Manchester encoded signals are modified so that a signal state transition corresponding to a zero data value is delayed to occur at the very end of the first half of the bit period associated with the zero data value.

4. A method for remotely testing transmission line conditions in a token ring network, comprising the steps of:
   generating at a remote station a series of test patterns simulating different frequency signals;
   writing each test pattern into a token ring packet frame;
   successively transmitting said test patterns from said remote station through a router connected to said token ring network to a receiving station on said token ring network;
   measuring the time required for each transmitted test pattern to be successfully transmitted from said remote station to said receiving station;
   comparing the transmission times measured for all transmissions; and
   determining that a marginal transmission line condition exists within said token ring network when the transmission time associated with one of said test patterns greatly exceeds the transmission times associated with the other test patterns.

5. The method in accordance with claim 4, wherein:
   said test patterns each comprise a differential Manchester encoded signal including a series of "one" and "zero" data values; and
   said test patterns include:
      a first test pattern comprising a sequence of all one data values;
      a second test pattern comprising a sequence of alternating one data values and zero data values; and
      third, fourth and additional test patterns comprising a sequence of one data values separated by two, three, and more zero data values, respectively.

6. The method in accordance with claim 5, wherein:
   said differential Manchester encoded signals include a series of bit periods wherein a signal state transition occurring within the first half of a bit period corresponds to a zero data value and a steady signal state throughout the first half of a bit period corresponds to a one data value;
   said differential Manchester encoded signals are modified so that a signal state transition corresponding to a zero data value is delayed to occur at the very end of the first half of the bit period associated with the zero data value.

* * * * *